United States Patent [19]

Gallagher

[11] Patent Number: 4,564,314

[45] Date of Patent: Jan. 14, 1986

[54] SELF-PROPELLED CONTINUOUS CONCRETE PIPE-LAYING MACHINE

[75] Inventor: Roger W. Gallagher, Scottsdale, Ariz.

[73] Assignee: Fullerform, Inc., Phoenix, Ariz.

[21] Appl. No.: 602,815

[22] Filed: Apr. 23, 1984

[51] Int. Cl.[4] ............................................. E02D 29/10
[52] U.S. Cl. .................................... 405/155; 405/154; 425/59
[58] Field of Search ............... 405/184, 155, 282, 154, 405/174; 425/59

[56] References Cited

U.S. PATENT DOCUMENTS

| | | | |
|---|---|---|---|
| 1,700,889 | 2/1929 | Heltzel | 405/272 X |
| 3,252,198 | 5/1966 | Fuller | 425/59 |
| 3,785,759 | 1/1974 | Johnson et al. | 425/59 |
| 4,247,222 | 1/1981 | Schosek | 405/184 |
| 4,259,030 | 3/1981 | Montoya | 405/282 X |
| 4,274,758 | 6/1981 | Schosek | 175/62 X |

Primary Examiner—Dennis L. Taylor
Attorney, Agent, or Firm—Warren F. B. Lindsley

[57] ABSTRACT

A self-propelled machine for casting in place heavy concrete sewer pipes in a pre-dug trench employing a detachably mounted winch on the forward end of the machine for connection to a deadman for pulling the machine along the trench.

1 Claim, 12 Drawing Figures

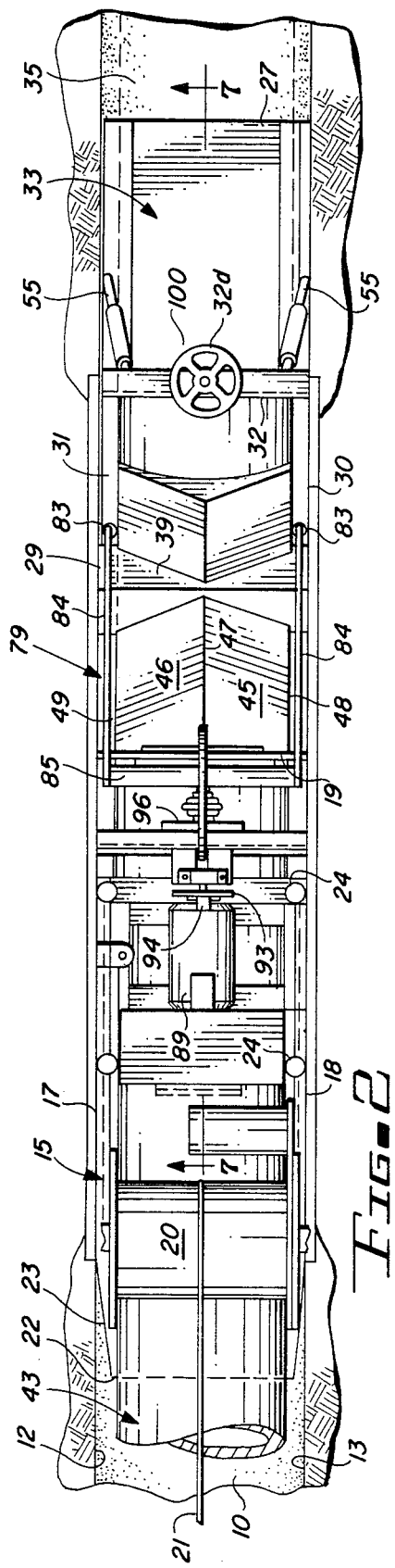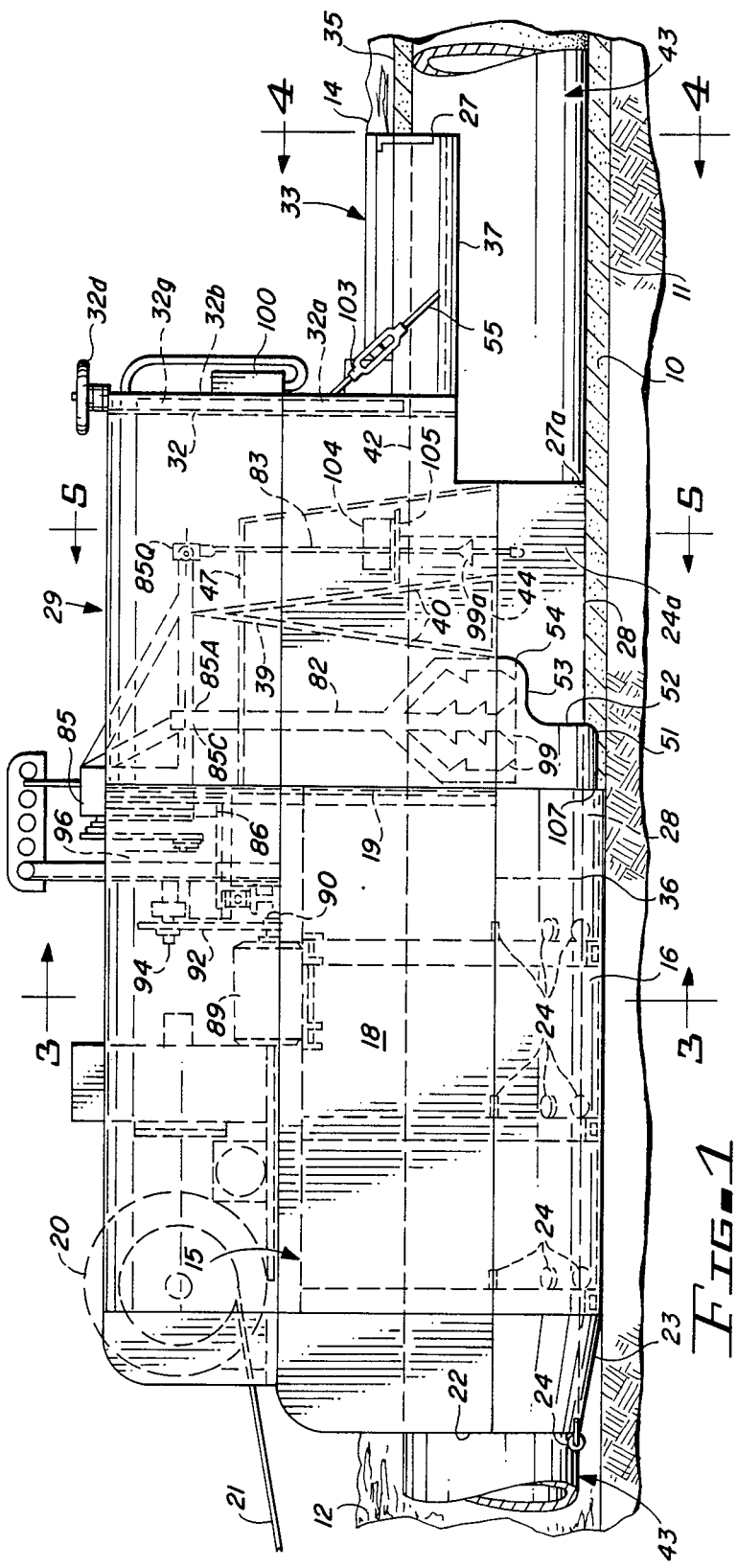

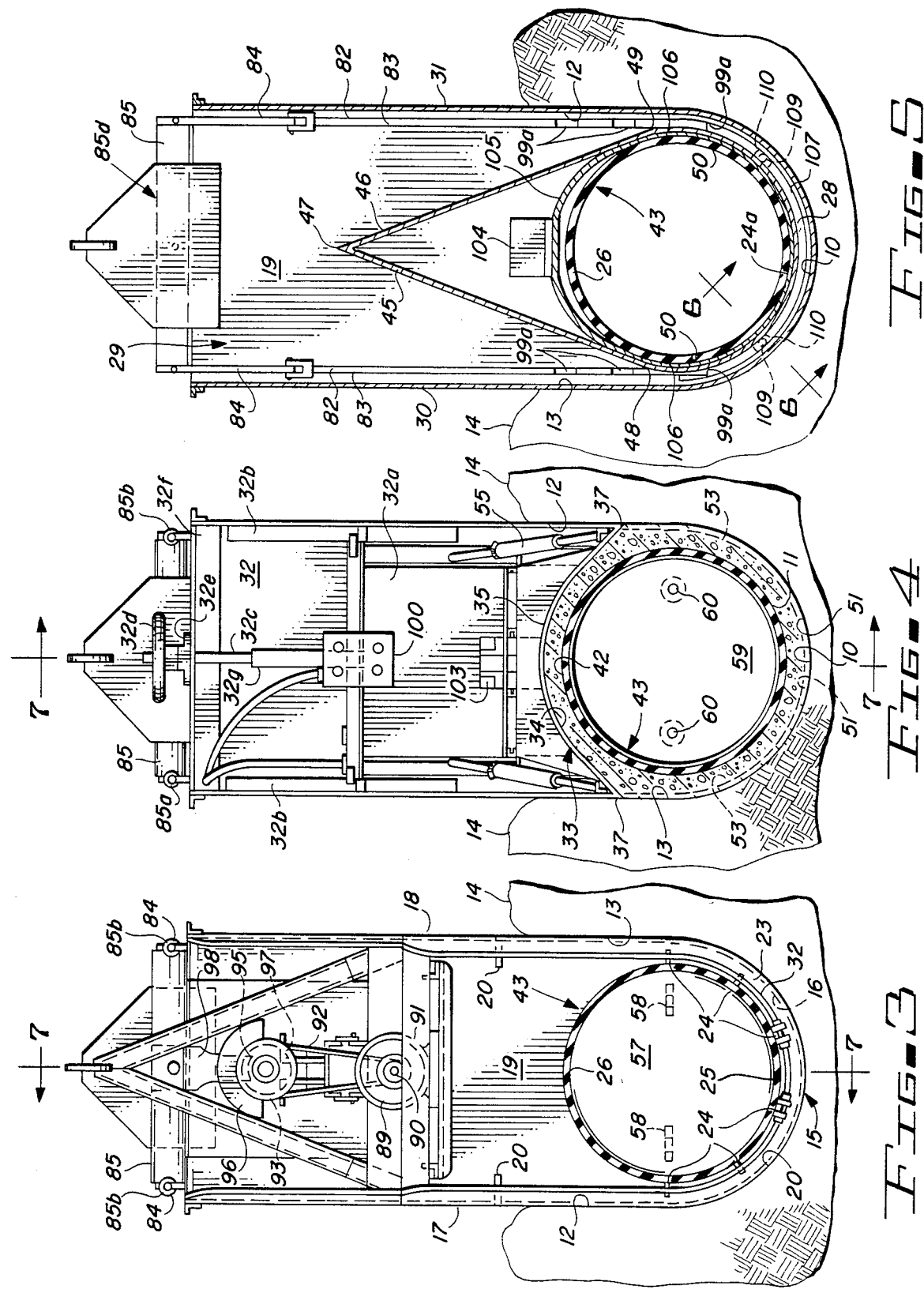

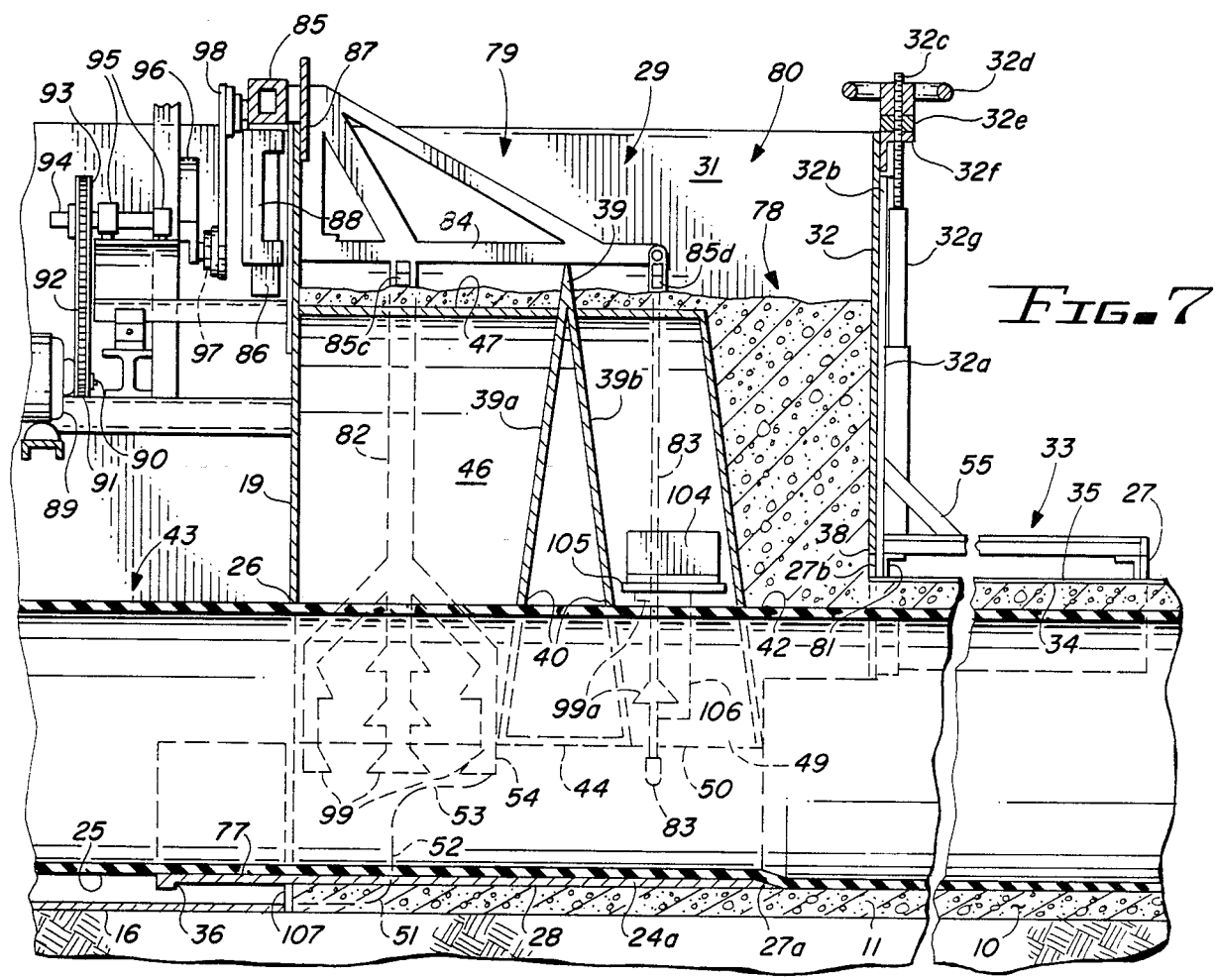
FIG. 7
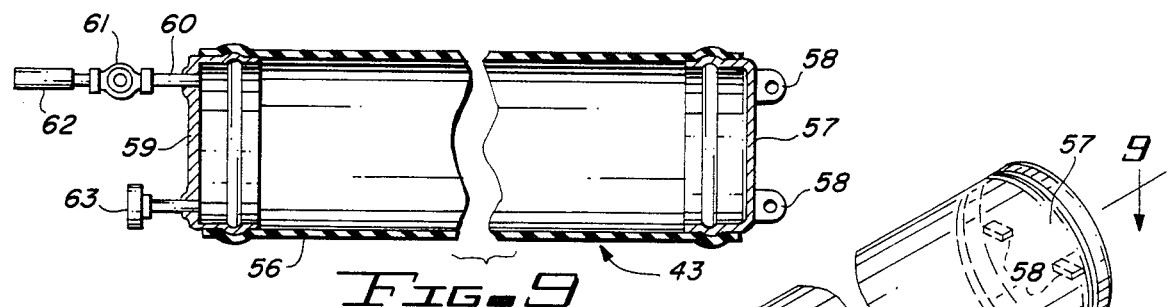
FIG. 9
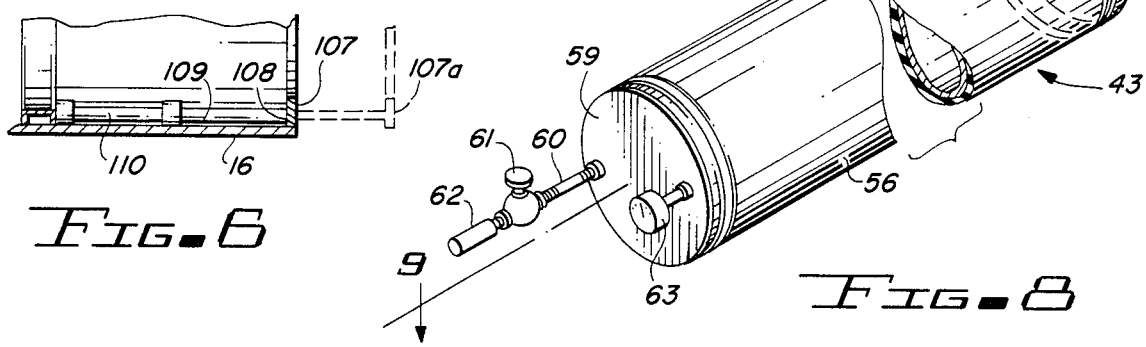
FIG. 6
FIG. 8

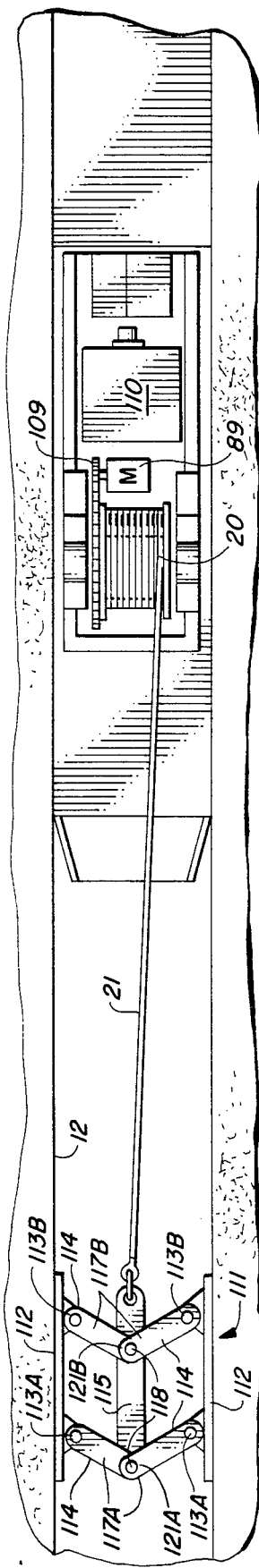
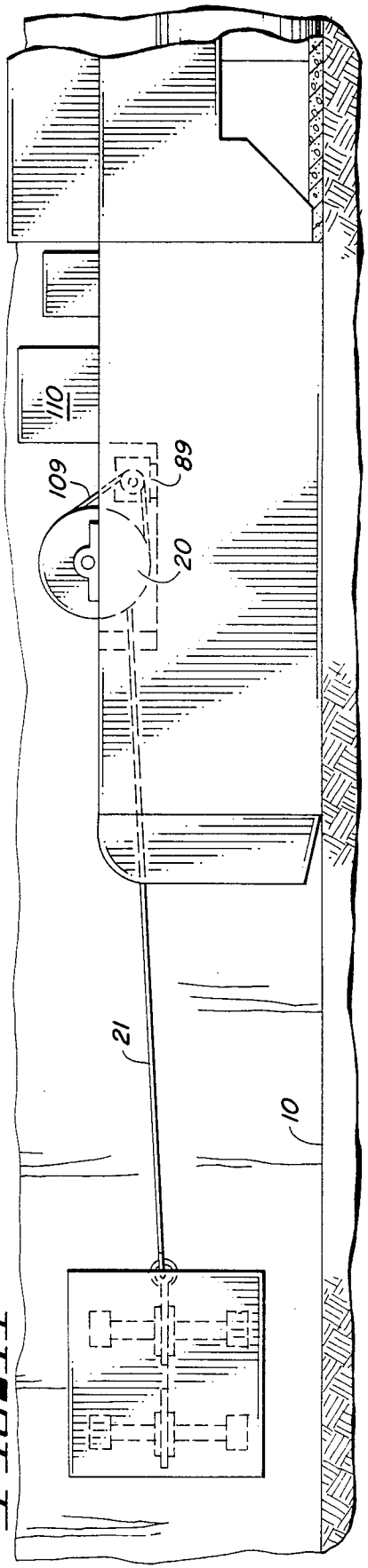
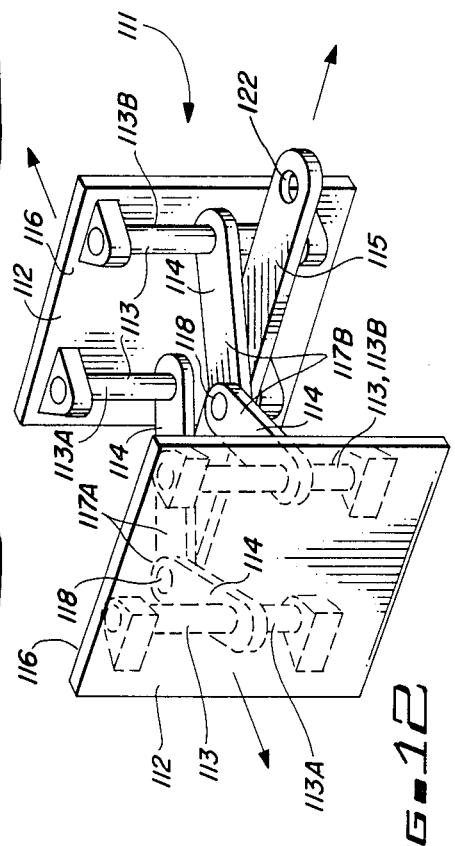

SELF-PROPELLED CONTINUOUS CONCRETE PIPE-LAYING MACHINE

BACKGROUND OF THE INVENTION

The typical modern city utilizes hundreds of miles of large diameter concrete pipe in its sewage collection system. As the city grows or improves its services, there is frequently the need to tear up streets and roadways to install new or larger sewer lines. Deep trenches are dug and concrete pipes several feet in diameter are installed. These new lines may extend several miles in length and their installation constitutes an extensive project in terms of the time and expense involved. Because of the interference with traffic and with the conducting of area businesses, it is important that the project be completed in as short a time as possible.

In the early application of concrete pipe for this purpose, the pipe sections were pre-cast at a fabricating facility and then transported to the point of installation. The hauling and installation of such large and heavy concrete pipes was difficult and expensive because the pipe sections had to be handled by heavy machinery. The hauling, distribution and installation of the pipes was also time consuming and added to the length of time that a given roadway had to remain torn up or blocked off.

It was then recognized that a more cost effective and time effective approach was to cast the concrete pipe in place. Such a pipe-casting machine is described in U.S. Pat. No. 3,252,198.

This machine substantially met the basic need for reducing the time and expense involved in the installation of the sewage lines, but the machine did not rise to its full potential because it was not self-propelled. This was a major disadvantage because a heavy tractor had to be made available to move the machine along. This was especially inconvenient because the deep trench and the earth removed from it constituted formidable obstacles in the areas over which the tractor had to be driven. Just having the tractor on hand for this purpose was also a significant expense.

The present invention is an improvement over the earlier machine of U.S. Pat. No. 3,252,198, the improvement comprising an inexpensive mechanism added to the machine to render it self-propelling.

SUMMARY OF THE INVENTION

In accordance with the invention claimed, a self-propelled machine is provided for casting in place heavy concrete sewer pipes in a predug trench.

It is, therefore, an object of the present invention to provide an improved machine for the installation of concrete pipe such as that employed in sewage systems.

Another object of the invention is to provide such a machine of a type that casts the concrete pipe in place as contrasted with one that might install pre-cast pipe sections.

A further object of the invention is to provide such a machine in a form that casts such concrete pipe in a continuous manner as contrasted with one that might cast the pipe in successive sections.

A still further object of the invention is to provide such a pipe-casting machine in a form utilizing an inflatable support member that replaces girders and other such supports and obviates the need for manual placement or removal of the supports.

A still further and key object of the invention is to provide such a machine in a form that is self-propelled in the sense that it is capable of moving itself along in the predug trench during the continuous pipe-casting operation.

A still further object of the invention is to provide as an integral part of such a machine an engine-driven hydraulic pump and associated hydraulic system for driving the propelling mechanism and other devices employed by the machine such as vibrators, tampers and trowels.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a left-hand side elevation of a continuous concrete pipe laying machine incorporating the features of this invention;

FIG. 2 is a plan view of the machine shown in FIG. 1;

FIG. 3 is a vertical transverse section of the machine indicated by the line 3—3 in FIG. 1;

FIG. 4 is a rear end elevation of the machine indicated by the line 4—4 of FIG. 1;

FIG. 5 is a vertical transverse section on the line 5—5 of FIG. 1;

FIG. 6 is an enlarged fragmentary section on the line 6—6 of FIG. 5;

FIG. 7 is an enlarged fragmentary vertical longitudinal section on the line 7—7 of FIGS. 2, 3 and 4;

FIG. 8 is a perspective view of the continuous inflatable sectional core;

FIG. 9 is an enlarged broken section of the pneumatically inflated core on the line 9—9 of FIG. 8;

FIG. 10 is a top plan view of the pipe-laying machine of the invention shown together with a special deadman employed as part of the self-propelling mechanism;

FIG. 11 is a side view of the machine, also showing the deadman and the self-propelling mechanism; and FIG. 12 is a perspective view of the deadman device employed in connection with the self-propelling mechanism incorporated in the machine.

DESCRIPTION OF THE PREFERRED EMBODIMENT

Referring more particularly to the drawings by characters of reference, the pipe-laying machine of the invention, as shown in FIGS. 1-12, is intended for operation in a predug trench or ditch, the ditch having an arcuate bottom 10 shaped to conform to the outside of the lower half 11 of the cast pipe, and having vertically disposed parallel sides 12 and 13 extending upwardly to ground level 14. The machine comprises a guide portion 15 having a semi-cylindrical bottom 16 and upstanding sides 17 and 18 slidingly engaging the bottom and sides of the predug ditch. To the rear end of the guide portion 15 is fixed a laterally disposed vertical baffle 19. Mounted on the front of the pipe-laying machine as shown in FIGS. 1 and 2 is a self-contained power unit, incorporating a hydraulic winch 20 to which a cable 21 is attached for moving the pipe-laying machine forward during the pipe-laying operation. Preferably, the front edge 22 of the guide portion 15 is turned inwardly at 23 to facilitate the sliding of the machine in the ditch without picking up dirt from the sides and bottom of the ditch.

Fixed to but spaced from the semi-cylindrical bottom 16 of the guide portion 15 are the core support rollers 24 having an arcuate arrangement, FIG. 3 conforming to the lower half 25 of the bore of the completed pipe. It will be noted that the core support rollers 24 are disposed from the front edge 22 of the guide portion 15 rearwardly toward the baffle 19 where there is provided a circular opening 26 conforming to the outside diameter of the core member 43. The bottom surface 28 of a core support member 24a extending rearwardly of the baffle 19 to the edge 27a is spaced from the bottom 10 of the predug ditch so as to form the desired thickness for the bottom half of the pipe and to effectively trowel the lower half of the pipe bore as the machine travels along the ditch. The core support member 24a extends through the opening 26 and terminates in an outwardly sloping lip 36 to facilitate placement of the core 43 in the machine.

In order to supply the plastic cement mud to the machine there is provided a hopper 29 comprising the sides 30 and 31 fixed to and extending rearwardly of the baffle 19 and connected at their rear edges to the rear transverse baffle 32. Rigidly fixed to and extending rearwardly from the rear transverse baffle 32 is the semi-cylindrical top trowelling member 33 having its inner concave surface 34 positioned to form the outside surface 35 of the top half of the pipe, the member 33 extending rearwardly to the rear end 27 of the machine. The rear transverse baffle 32 extends downwardly and terminates at the lower edges 37 of the top trowelling member 33 and has an arcuate cut-out passageway 38 conforming to the inner concave surface 34 of the top trowelling member.

It will be noted that the front edge 27b of the top trowelling member 33 is fixed to the vertically movable plate 32a having its side vertical edges suitably supported in vertical guideways 32b fixed to the rear ends of the sides 30 and 31. Suitable stabilizing rods and turnbuckles 55 may be provided between the upper portions of the vertically movable plate 32a and the outer rear end of the top trowelling member 33. An upwardly extending adjusting screw 32g is fixed at its lower end to the vertically movable plate 32a and has its upper threaded portion 32c operatively engaging in the mating threaded bore of the adjusting handwheel 32d journaled against axial movement in a suitable bearing 32e carried in the cross member 32f fixed to the top rear edge of the hopper and rear transverse baffle 32 so that by manipulating the handwheel 32d the top trowelling member 33 may be vertically adjusted to vary the thickness of the top half of the pipe during the horizontal travel of the machine in laying the pipe. Thus, thicker top pipe sections can be easily provided as the machine crosses roads or other areas requiring greater strength for the pipe while the top section can be readily thinned by lowering the trowelling member 33 for areas not requiring high load capacity, any such adjustment being undertaken with the machine in actual operation.

Intermediate the baffle 19 and the rear transverse baffle 32 is a transverse partition 39 having forwardly and rearwardly sloping plates 39a and 39b rigidly fixed to the sides 30 and 31 of the hopper 29. This partition 39 has a semi-circular cut-out 40 in the lower edges of the plates 39a and 39b just slightly larger than the bore of the pipe which engages the upper half portion 42 of the pneumatically inflatable core members 43 to prevent flow of liquid cement through the cut-outs 40; the partition 39 terminating at its lower edge 44 with this portion of the sides 30 and 31 of the hopper.

Between the baffle 19 and the partition 39 is fixed a pair of divergently sloping plates 45 and 46, FIG. 5, connected together at an apex 47 and extending downwardly and merging with side plates 48 and 49 whose lower edges are rigidly fixed to the upper edges of the core support member 24a at the points 50 so as to form a completely enclosed tunnel between the baffle 19 and the partition 39 for relative sliding of the core member 43 therethrough as the machine travels along the ditch. It will be noted that between the baffle 19 and the partition 39 the rear end of the guide portion 15 slopes upwardly as indicated at 51, 52, 53 and 54 to aid in the distribution and smooth flow of the concrete under the core support member into the lower half of the ditch.

In conjunction with the operation of this machine there is provided a continuous pneumatically supported core apparatus 43 which relatively slides along on the rollers 24 and the concave upper surface of core support member 24a. This core apparatus comprises a rubber or plastic tube 56, FIG. 9, which may be collapsed and rolled up for easy handling or storage and which is closed on one end by a suitable header 57 having eyelet lugs 58 fixed to the outside face thereof for securing the core against longitudinal movement in the ditch during the pipe laying operations. The other end of the tube 56 has the supply header 59 fixed therein to which is connected the air supply pipe 60 having a shut-off valve 61 to which is connected the fluid pressure supply pipe 62. A suitable pressure gauge 63 may be mounted on the supply header 59 so as to indicate the inflation pressure in the tube 56.

To prepare the core 43 for use, air pressure is applied from line 62 to inflate the tube 56 to required pressure. The machine is placed at one end of the previously dug trench and the inflated core is placed in the trench and its header end 57 passed through the machine, as shown best in FIG. 1. The eyelet lugs 58 of the header 57 are then suitably secured to prevent longitudinal movement of the core 43 during the initial stages of travel of the machine during the pipe laying operation.

With the core 43 assembled in the machine ready for the forming operation as above described, plastic concrete of suitable consistency and body is supplied at 78 filling the front compartment 79 and the rear compartment 80 of the hopper 29. The supply of material from the front compartment 79 flows down the sloping plates 45 and 46 in the bottom thereof and then down between the sides 30 and 31 of the hopper and the side plates 48 and 49 to fill the space between the bottom 10 of the ditch and the bottom surface 28 of the core support member 24a, the lower edges 44 of the partition 39 screeding off the material as the machine is pulled along in the ditch to complete the lower half of the pipe.

In the rear compartment 80 the material is being presented directly against the top half 42 of the core 43 as it emerges from the cut-out 40 and also against the top edges of the material just poured forming the lower half of the pipe. As the machine progresses to the left in FIGS. 1 and 7 the core 43 is guided smoothly into the machine by the rollers 24 and outwardly sloping lip 36 on the leading edge of the upper concave surface 77 of the core support member 24a. The edge 81 of the top trowelling member screeds off the top outside surface of the upper half of the poured pipe while the top trowelling member completes this surface to proper finish and thickness depending upon its setting by handwheel 23d, thus completing the pipe structure. As the core 43 relatively passes out from the rear end 27a of the core support member 24a, it comes in contact with and rests on the bottom trowelled bore portion of the poured pipe and thereby supports the upper portion of the poured pipe until it has set, ready to deflate and remove the core 43.

In certain instances where the material requires it, suitable agitators or tampers may be utilized. Such tamping devices may comprise the downwardly extending tamper bars 82 and 83 which are pivoted at 85a and 85b from oscillating yoke bars 85c and 85d. Yoke bars 85c and 85d are supported by the vertically reciprocating bars 84 which are connected together by the lateral bar 85 which, in turn, is mounted on a suitable guide rod 86 that is vertically slidable in the guide bore 87 in the bracket 88 fixed to the baffle 19. A suitable hydraulic drive motor 89, as shown in FIG. 1, has an output shaft 90 and a sprocket 91 over which operates a chain 92 which in turn drives a sprocket 93 fixed to a crankshaft 94 journaled in a bracket 95 suitably fixed to the baffle 19. The other end of the crankshaft 94 has a disc 96 fixed thereto and a crankpin 97 on said disc which is pivotally connected by a link 98 to the lateral bar 85 so that operation of the motor 89 effects vertical reciprocation of the tamper bars 82 and 83. The tamper bars 82 have tamping feet 99 located in the space between sides 30 and 31 of the hopper and the side plates 48 and 49 to facilitate the firm compaction of the concrete in the lower half 11 of the pipe while the tamper bars 83 have tamping feet 99a on their lower ends located between the sides 30 and 31 of the hopper and the upper half 42 of the core emerging from the partition 39 so as to get good compaction of the concrete for the upper half of the pipe. A suitable control device 100 may be utilized to control the operation of the hydraulic motor 89 for the actuation of the tampers 82 and 83 at the desired speed. To further facilitate the proper flow and compaction of the concrete there is provided a vibrator 103 fixed to the top front portion of the top trowelling member closely adjacent the vertically movable plate to produce the proper trowelling effect on the top section of the finished pipe. A further vibrator 104 is fixed to the vibrator bridge 105 in turn supported at its ends 106 on the side plates 48 and 49 to facilitate flow of concrete at the point of merging of concrete flowing from the hopper compartments into the bottom half and the top half of the concrete pipe being formed. Both of the vibrators 103 and 104 may be appropriately controlled by device 100.

The pipe-laying machine of the invention is rendered self-propelling through the addition of an internal combustion engine 110 with an integral hydraulic pump, the winch 20, the hydraulic drive motor 89, the cable 21 and a deadman 111.

The winch 20, the engine 110 and the motor 89 are supported on a detachably mounted frame atop the forward structure of the pipe-laying machine, as shown in FIGS. 10 and 11. The motor 89 is driven at a controlled speed by the engine 110 and its hydraulic pump. Motor 89 is coupled to winch 20 by means of a cable or chain 109. One end of the cable 21 is attached to the deadman 111 the other end is fed into winch 20.

As shown in FIGS. 10-12, the deadman comprises a structure of plates and pivoting levers. The cable 21 is attached to the lever system in a manner which causes the plates to be spread apart as a pulling force is applied to the cable.

As shown most clearly in FIG. 12, the deadman 111 comprises two rectangular plates 112, four vertical pivot pins 113, four spreading levers 114 and one draw bar 115.

The two plates 112 are oriented vertically, mutually parallel and parallel with the vertical walls 12 and 13 of the trench.

On the inside face 116 of each of the plates 112 are mounted two of the pivot pins 113. The pins 113 are mounted just inboard of the vertical edges of the plates 112, in parallel arrangement therewith, and are positioned away from the face 116 a sufficient distance to allow a working space between the pin 113 and the face 116. There is thus provided on each of the plates 112 a forward pivot pin 113a and an aft pivot pin 113b.

Each of the spreading levers 114 comprises a flat strip of metal with a circular opening through each end for a pivot pin. Two of the levers 114 form a forward jackknife 117a and the other two form an aft jackknife 117b. To form a jackknife, two of the levers are pivotally coupled together at a common end by means of a pivot pin 118. The other end of one of the levers 114 is pivotally coupled to a first pivot pin 113 of one of the plates 112 while the other end of the other lever 114 is pivotally coupled to a second pivot pin 113, directly opposite the first pivot pin 113 and on the other plate 112. The pivotal coupling of the levers 114 to the pins 113 is accomplished by the passage of the pins 113 through the circular opening in the end of the lever 114. In this way, the forward jackknife 117a is pivotally coupled to the forward pivot pins 113a and the aft jackknife 117b is pivotally coupled to the aft pivot pins 113b.

The draw bar 115 is a flat elongated bar with two pivot holes 121a and 121b and one cable attachment hole 122. The first pivot hole 121a is located at one end of bar 115; the attachment hole 122 is located at the opposite end, and the second pivot hole 121b is located in intermediate holes 121a and 122 and is spaced from hole 121a a distance equal to the separation between the forward and aft pivot pins 113a and 113b. The pivot pin 118 which couples the two levers 114 of forward jackknife 117a together also passes through hole 121a while the other pivot pin 118 passes through hole 121b as it couples together the levers 114 of aft jackknife 117b.

As shown in FIG. 10, the lengths of the levers 114 are such that the jackknives 117a and 117b are only partially open when the plates 112 are brought to bear against the side walls 12 and 13 of the trench. Also, as shown in FIG. 10, the deadman 111 is positioned in the trench with the levers 114 tilted at their outer ends toward the winch 112 so that as the cable 21 exerts a pulling force on the draw bar 115, the force applied to the pivot pins 118 tends to drive the jackknives 117a and 117b toward a more open condition. As the pulling force builds, the opening process progresses until the plates 112 are forced tightly against the side walls 12 and 13 to anchor the deadman securely in position. With the deadman thus securely anchored in place, the pipe-casting machine then moves slowly forward as the cable 21 continues to be taken up by the winch 20.

After some time, the pipe-casting machine will arrive at the position of the deadman and the deadman will have to be moved forward. With a conveniently long cable, the deadman will have to be moved only a few times each day and this can be accomplished with the help of a small tractor or truck that is typically available for other purposes.

It will be recognized that the single engine and its associated hydraulic pump can serve the winch 20, the tampers 82 and 83 and the other power driven accessories associated with the pipe-casting machine. Further, the winch 20 can be an integral unit, frame mounted, so that it can be easily removed and remounted on other pipe-laying machines and driven by an internal combustion gasoline engine.

A self-propelled continuous concrete pipe laying machine is thus provided in accordance with the stated objects of the invention, and although but a single embodiment of the invention has been illustrated and described, it will be apparent to those skilled in the art that various changes and modifications may be made therein without departing from the spirit of the invention or from the scope of the appended claims.

What is claimed is:

1. A self-propelled continuous concrete pipe-laying machine using a fluid pressure inflatable core comprising:
    a guide portion having a semi-cylindrical bottom and vertically disposed sides slidably engaging a mating semi-cylindrical bottom pre-dug trench to receive the pipe,
    a laterally disposed vertical baffle fixed to the rear end of said guide portion,
    an elongated horizontally disposed arcuate core support member fixed in spaced position from the inside surface of the bottom and sides of said guide portion and extending through a circular opening in said baffle and rearwardly of said baffle so as to define a space between the bottom of said trench and the underside of said core support member for troweling the lower half of the bore of said pipe to be formed,
    a hopper fixed to and extending rearwardly of said lateral baffle and located above said core support and troweling member,
    a top troweling member fixed to and extending rearwardly of said hopper,
    an intermediate transverse partition extending between the sides of said hopper forming a front and rear compartment in said hopper,
    a core receiving tunnel in the lower portion of said front compartment communicating with an opening in said transverse baffle and an arcuate cutout in the bottom of said partition.
    passageways each side of said tunnel and the sides of said hopper connecting said front compartment to said space below said core support member including a guide portion sloping upwardly and rearwardly from said baffle to said partition each side of and spaced from said core receiving tunnel,
    said rear compartment being in direct communication with the top half of said core carried on said core support member upon emergence from said partition cutout and with the top edges of the poured bottom half of said pipe and including a material discharge passageway above said core and top edges for supplying material under said top troweling member upon movement of said machine in the trench,
    winch means mounted atop the forward end of the machine comprising a cable connected at one end to the winch means and the other end connected to a deadman,
    said winch means comprising a frame detachably mounted on said machine and a hydraulically operated internal combustion engine driven apparatus mounted on said frame,
    a deadman for mounting in the pre-dug trench forward of the machine for providing a temporary anchor for the other end of the cable so that the winch means, upon actuation, may wind up the cable, thereby pulling the machine along the trench toward the deadman,
    said deadman comprising a pair of plates that are vertically oriented to each other and arranged substantially vertical to the walls of the trench,
    lever means forming a jackknife configuration comprising at least a pair of levers pivotally interconnected at common ends and each pivotally connected at its other end to a different one of said plates,
    an elongated draw bar connected at one end to said lever means and at the other end to said other end of said cable,
    whereby when said bar is pulled on and said jackknife configuration of said lever means is biased toward its straightened position, said deadman will anchor itself to the side walls of the trench.

* * * * *